United States Patent
Maruta

(10) Patent No.: US 6,335,119 B1
(45) Date of Patent: *Jan. 1, 2002

(54) LITHIUM BATTERY AND METHOD OF PRODUCING POSITIVE ELECTRODE ACTIVE MATERIAL THEREFOR

(75) Inventor: Junichi Maruta, Kyoto (JP)

(73) Assignee: Japan Storage Battery Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/862,269

(22) Filed: May 23, 1997

(30) Foreign Application Priority Data

May 24, 1996 (JP) .............................. 8-153238

(51) Int. Cl.[7] .......................... H01M 4/32; H01M 4/48; H01M 6/00
(52) U.S. Cl. ................... 429/223; 429/231.3; 29/623.1; 423/594; 423/599
(58) Field of Search .............................. 429/223, 231.3; 423/594, 599; 29/623.1

(56) References Cited

U.S. PATENT DOCUMENTS

| | | | | |
|---|---|---|---|---|
| 5,531,920 A | * | 7/1996 | Mao et al. ................ | 252/182.1 |
| 5,720,932 A | * | 2/1998 | Amine et al. ................ | 423/594 |
| 5,783,334 A | * | 7/1998 | Yasuda ........................ | 429/223 |
| 5,879,654 A | * | 3/1999 | Van Ghemen et al. ....... | 423/593 |

FOREIGN PATENT DOCUMENTS

| | | |
|---|---|---|
| EP | 0 624 552 A | 11/1994 |
| JP | A-63-19760 | 1/1988 |
| JP | A-63-19761 | 1/1988 |
| JP | 63-019760 | 1/1988 |
| JP | 63-019761 | 1/1988 |
| JP | A-6-310145 | 11/1994 |

OTHER PUBLICATIONS

CRC Handbook of Chemistry and Physics, 63rd Edition. Edited by R. Weast. CRC Press. pp. D–162 to D–164, 1982.*
CRC Handbook of Chemistry & Physics, 63rd ed. Edited by R. Weast. CRC Press. pp. D–162 to 164, 1982.*
Dahn et al., "Structure and Electrochemistry . . . ", Solid State Ionics 44 (1990), pp. 87–97. No month.
Ohzuku et al., "New Route to Prepare . . . ", Chemistry Express, vol. 7, No. 9, pp. 689–692 (1992). No month.
Yasuda et al., "Influence of Cobalt Addition . . . ", GS News, vol. 37, No. 2, pp. 84–89 (1978). No month.
Uflyand et al., "Study of the Properties . . . ", Soviet Electrochem. (Scientific–Research Storage Battery Institute, vol. 6, No. 9, 1268–1272 (1970). No month.
Yasuda, "Effects of Cadmium Hydroxide . . . ", GS News, vol. 45, No. 1, pp. 23–30 (1986). No month.
Arai et al., "Synthesis . . . ", 33rd Battery Discussion Lecture Summary, pp. 21–22, (1992). No month.
R. J. Gummow and M. M. Thackeray, "Characterization of LT–Li$_x$Co$_{1-y}$Ni$_y$O$_2$ Electrodes for Rechargeable Lithium", J. Electrochem. Soc., vol. 140, No. 12, 3365 (Dec. 1993).

(List continued on next page.)

Primary Examiner—Carol Chaney
Assistant Examiner—Tracy Dove
(74) Attorney, Agent, or Firm—Sughrue Mion, PLLC

(57) ABSTRACT

In a method of producing a positive active material for a lithium battery, a compound represented by the chemical formula $H_xLi_yMO_2$ in a solution containing lithium ions is chemically oxidized, where $0 \leq x \leq 2$, $0 \leq y \leq 2$, $1 < (x+y) \leq 2$, and M is one or two kinds of transition metals selected from Co and Ni.

10 Claims, 2 Drawing Sheets

OTHER PUBLICATIONS

Frederic L. Cras, et al., "Low–temperature Lithium–Manganese Oxide Cathode Materials for Polymer Batteries", *Journal of Power Sources,* 63 (1996) 71–77. No month.

Y. Fujita, et al., "LiNi$_{1-x}$Co$_x$O$_2$ Prepared at Low Temperature using β–Ni$_{1-x}$Co$_x$OOH and either LiNO$_3$ or LiOH", *Journal of Power Sources,* 68 (1997) 126–130. No month.

G. G. Amatucci, et al., "Synthesis of Electrochemically Active LiCoO$_2$ and LiNO$_2$ at 100° C.", *Solid State Ionics* 84 (1996) 169–180, No month.

Junichi Maruta, et al., "Low Temperature Synthesis of Lithium Nickelate Positive Active Material from Nickel Hydroxide for Lithium Cells", *Journal of Power Sources,* 90 (2000) 89–94. No month.

Junichi Maruta, et al., "Low–Temperature Synthesis of LiNi$_{1-x}$CO$_x$(OH)$_2$ for Lithium Cells", The 40$^{th}$ Battery Symposium in Japan, (1999) 69–70. No month.

* cited by examiner

LITHIUM BATTERY AND METHOD OF PRODUCING POSITIVE ELECTRODE ACTIVE MATERIAL THEREFOR

BACKGROUND OF THE INVENTION

1. Field of the Invention

The present invention relates to a lithium battery and a method of producing a positive-electrode active material for lithium batteries.

2. Description of the Related Art

With the advance of portable electronic appliances, the development of high-performance batteries has been required in recent years. A lithium ion battery, in which a carbon material is used in its negative electrode, and lithium cobaltate is used as stratiform composite oxide in its positive electrode, has been put into practice as a non-aqueous solution battery which has high operating voltage and high energy density. However, since lithium cobaltate is rare in terms of resources and expensive, lithium- manganese composite oxide or lithium nickelate has been proposed as a substitute for lithium cobaltate. Lithium- manganese composite oxide has a problem that not only is theoretical capacitive density low but also reduction in capacity becomes remarkable as the charging/discharging cycle is repeated.

On the other hand, lithium nickelate (lithium-nickel oxide) is a stratiform compound having the same crystalline structure as lithium cobaltate which is put into practice. In the lithium nickelate, lithium is inserted between layers of $NiO_6$ octahedrons having edges in common. A method of producing lithium nickelate generally comprises the steps of: mixing $Ni(NO_3)_2$, $Ni(OH)_2$, $NiCO_3$, NiO, NiOOH, etc. used as a nickel source and LiOH, $LiNO_3$, $Li_2CO_3$, $Li_2O_2$, etc. used as a lithium source; and heating the mixture at a temperature range of about 600° C. to about 900° C. in an oxygen stream.

The structure of lithium nickelate is, however, similar to a rock salt structure as reported in Solid State Ionics, 44, 87, 1990, Chem. Express, 7, 689, 1992, or the 33rd Battery Discussion Lecture Summary, p.21, 1992. Accordingly, there is a problem that the capacity is reduced because nickel and lithium are easily replaced by each other so that a partially disordered structure is generated.

Further, there is an attempt to use nickel oxyhydroxide as a nickel raw material. The attempt is disclosed in Japanese Patent Unexamined Publication No. Sho-63-19760. In the Japanese Patent Unexamined Publication No. Sho-63-9760, there is a proposal in which nickel oxyhydroxide containing cobalt in a range of from 20% to 75% is used as a lithium battery active material. In order to attain improvement in discharging characteristic, Japanese Patent Unexamined Publication No. Hei-6-310145 has proposed a method in which hydroxide or oxide containing trivalent nickel ions is mixed with a lithium salt and then, the mixture is heated. According to this Japanese Patent Unexamined Publication No. Hei-6-310145, a sodium hypochlorite aqueous solution, an aqueous solution of chlorine or an aqueous solution of bromine is made to react with a sodium hydroxide solution containing dispersed divalent nickel hydroxide ($Ni(OH)_2$) to thereby produce nickel oxyhydroxide. After the hydroxide or oxide containing nickel oxyhydroxide is mixed with lithium nitrate, the mixture is pressed, molded, dried and heated in air at a temperature range of 600° C. to 800° C. Then, the mixture is pulverized, molded and heated again in air at a temperature range of 700° C. to 900° C. so as to be sintered to thereby produce lithium nickelate.

It is, however, difficult to produce pure lithium nickelate by these methods. Particularly, there is a large defect that not only the voltage in charging/discharging characteristic varies multistageously, for example, in four stages but also the high-rate discharging performance is lowered. Japanese Patent Application No. Hei-7-129663 has proposed a synthesis method to solve this problem. In this method, cobalt-containing nickel oxyhydroxide is heated while lithium nitrate is made to act on the cobalt-containing nickel oxyhydroxide to thereby synthesize lithium nickelate exhibiting a uniform charging/discharging reaction.

As one attempt of a low-temperature synthesis method, which is not such a high-temperature synthesis method by solid-phase reaction, there is a synthesis method using ion exchange as proposed in Japanese Patent Unexamined Publication No. Hei-6-349494. There is, however, no demonstration concerning lithium nickelate. Furthermore, it is difficult to synthesize pure β-NiOOH which can be made to be a starting material for synthesis of lithium nickelate and, consequently, it is difficult to obtain lithium nickelate of high purity.

On the other hand, production of lithium nickelate not by a chemical synthesis method but by an electrochemical method is described in Soviet Electrochem., 6, 1268, 1970; GS News, 37, 84, 1978; and GS News, 45, 23, 1986. In those publications, however, only the behavior as positive electrodes for an alkali battery is disclosed.

Japanese Patent Unexamined Publication No. Sho-63-19761 shows an example of applying an electrochemically produced lithium nickelate to a lithium battery. In the Japanese Patent Unexamined Publication No. Sho-63-19761, use of nickel hydroxide charged in a lithium hydroxide solution as an active material is proposed. In this method, however, it is necessary to control the producing process strictly in order to obtain a stable active material.

As described above, a method comprising the steps of: mixing a nickel compound with a lithium compound; and heating the mixture at a temperature of 600° C. to 900° C. in an oxygen atmosphere is a general method for synthesizing lithium nickelate. However, partially disordered structure produced at a high temperature becomes a serious problem. Furthermore, there is a large defect that not only the voltage in charging/discharging characteristic varies multistageously, for example, in four stages but also the high-rate discharging performance is lowered. Accordingly, lithium nickelate does not serve as a substitute for lithium cobaltate having the same stratiform structure. From the point of view of electrode reaction, this is considered to be caused by the fact that the diffusion of lithium ions with the charging/discharging reaction is difficult and is not performed evenly in lithium nickelate.

Further, an attempt to synthesize lithium nickelate at a low temperature has been made in order to obtain lithium nickelate having a uniform structure. It is, however, difficult to obtain a uniform sample because reactivity is lowered when the temperature is low in a solid-phase burning method. Accordingly, the proposal of a low-temperature synthesis method using a simplified process different from the high-temperature synthesis method by solid-phase reaction has been required and, from the point of view of safety and cost, the low-temperature synthesis method is considered to be preferred. However, no useful synthesis method has ever been established.

SUMMARY OF THE INVENTION

It is an object of the present invention to provide a synthesis method of lithium nickelate where the raw material is easily obtainable and where the production is simplified by using a low-temperature synthesis method, and further to provide an active material having a stable charging/discharging performance and a lithium battery using such an active material.

The positive electrode active material for lithium batteries according to the present invention comprises the step of chemically oxidizing a compound represented by the chemical formula $H_xLi_yMO_2$ in a solution containing lithium ions, where $0 \leq x \leq 2$, $0 \leq y \leq 2$, $1 < (x+y) \leq 2$, and M is one or two kinds of transition metals selected from Co and Ni. Preferably, the compound is nickel hydroxide; the compound is nickel hydroxide containing nickel oxyhydroxide; the cobalt content of the compound is in a range of from 2 to 90 mol % {Co/(Ni+Co)}; the solution containing lithium ions has lithium hydroxide and water as constituent elements; and/or peroxodisulfate is used as an oxidizing agent in the oxidizing step.

As described above, because the positive electrode plate using the lithium battery active material according to the present invention can be formed not from nickel β-oxyhydroxide which is difficult to synthesize but from available nickel hydroxide as a starting material and no high-temperature treating process is required, an inexpensive and simple producing method can be provided. In addition, the obtained active material shows a good cycling performance and a monotonous variation of the potential with charge and discharge. Accordingly, the industrial value of the present invention is very large.

DETAILED DESCRIPTION OF THE INVENTION

Figure 1:
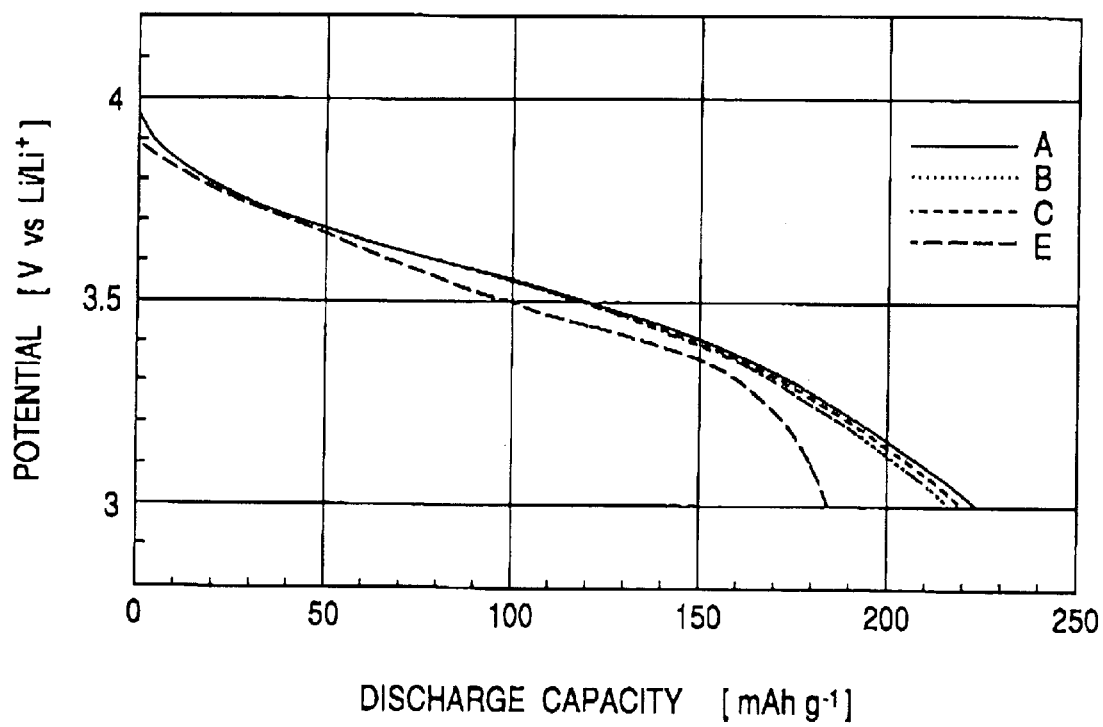
FIG. 1 is a graph for comparing the discharging characteristic of the positive electrode according to the present invention with the discharging characteristic of the conventional positive electrode.

Detailed description of the present invention will be described referring to the accompanying drawings as follows.

A subject of the present invention is not a method of producing an active material for lithium battery by using a conventional solid-phase reaction method at high temperature but a method in which a compound represented by the chemical formula $H_xLi_yMO_2$ (where $0 \leq x \leq 2$, $0 \leq y \leq 2$, $1 < (x+y) \leq 2$, and M is one kind or two kinds of transition metals selected from Co and Ni) is used as a starting material, and the compound is oxidized in a solution containing lithium ions to thereby synthesize a positive active material for a lithium battery. The battery active material according to the present invention exhibits activity higher than that of the active material produced by any conventional producing method. This result is considered to be due to the new synthesis method according to the present invention at a low temperature not higher than 100° C. which can produce the active material having a large surface area and little disordering in the structure, in contrast to the conventional high-temperature synthesis method by a solid-phase reaction.

Further, when the cobalt content of the aforementioned chemical compound is specified to be in a range of from 2 to 90 mol % {Co/(Ni+Co)}, preferably in a range of from 2 to 50 mol % {Co/Ni+Co)}, more preferably in a range of from 2 to 20 mol % {Co/Ni+Co)}, it is easy to diffuse lithium ions so that not only the reaction for producing lithium nickelate is accelerated but also discharging characteristic becomes very uniform.

Furthermore, when peroxodisulfate is used as an oxidizing agent in the aforementioned oxidizing step, a target product is obtained very easily so that the time of the producing process can be shortened.

Incidentally, it is a matter of course that the lithium battery according to the present invention can be applied both to a primary battery and to a secondary battery.

EXAMPLES

The present invention will be described below on the basis of the following examples.

Example 1

Nickel hydroxide powder having a particle size in a range of from 5 to 50 μm was treated with potassium peroxodisulfate in an aqueous solution of 4.5 M lithium hydroxide at 80° C. to thereby obtain a lithium nickelate positive active material A according to the present invention.

Example 2

$Li_2Ni_{0.95}Co_{0.05}O_2$ powder having a particle size in a range of from 5 to 50 μm was treated with sodium hypochlorite in a solution of 2 M lithium perchlorate/acetonitrile at 80° C. to thereby obtain a lithium nickelate positive active material B according to the present invention.

Example 3

Nickel hydroxide powder and nickel oxyhydroxide powder each containing 10 mol % cobalt {Co/(Ni+Co)} and each having a particle size in a range of from 5 to 50 μm were mixed in the weight ratio of 1:1. The mixture was treated with a hydrogen peroxide solution in an aqueous solution of 4 M lithium hydroxide at 80° C. to thereby obtain a lithium nickelate positive active material C according to the present invention.

Example 4

Nickel hydroxide powder having a particle size in a range of from 5 to 50 μm was treated with potassium peroxodisulfate in an aqueous solution of 4.5 M lithium hydroxide at 25° C. to thereby obtain a lithium nickelate positive active material D according to the present invention.

Figure 2:
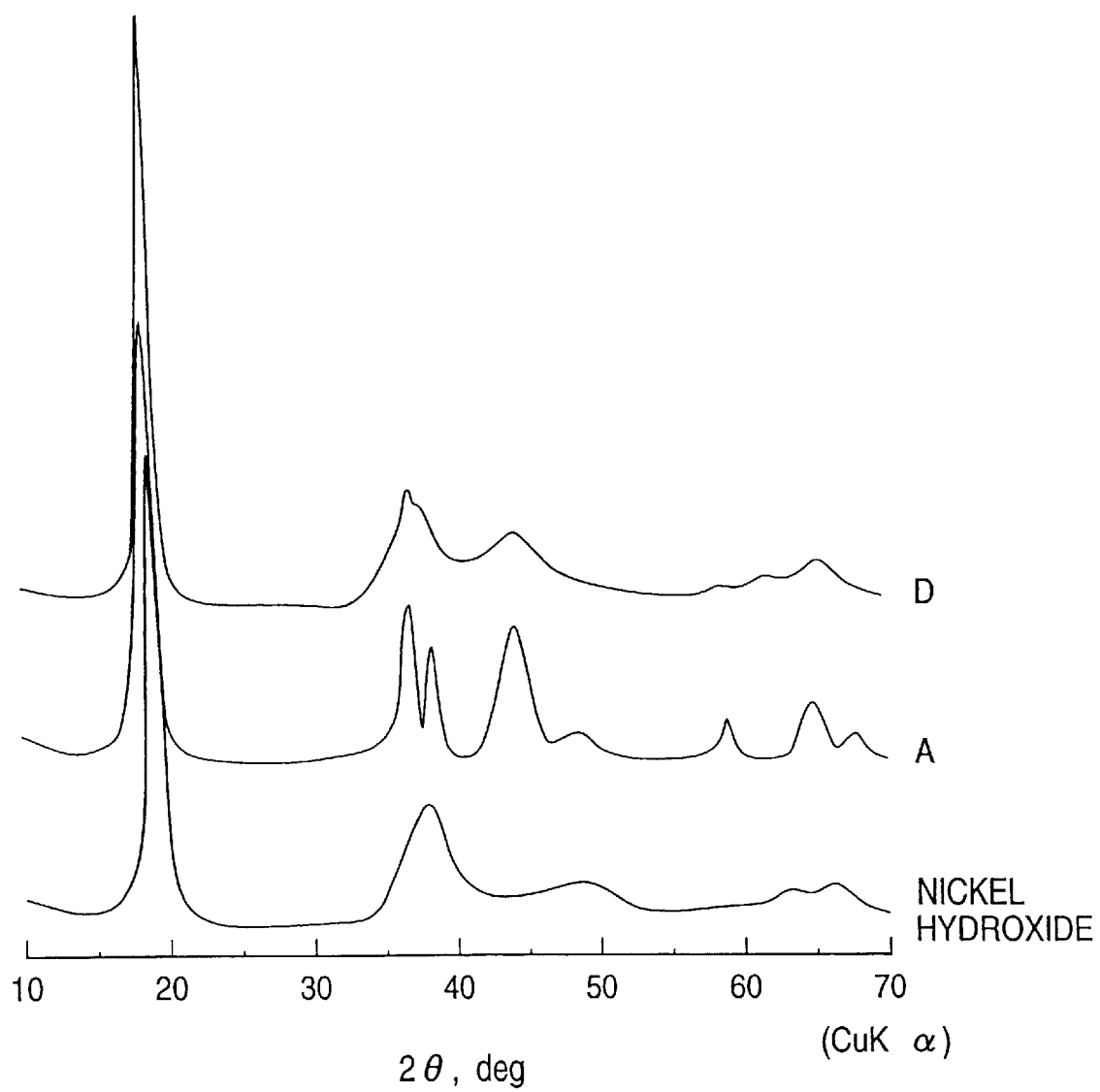
FIG. 2 is a graph showing X-ray diffraction patterns of nickel hydroxide as a starting material and of lithium nickelate A and D according to the present invention.

Powder X-ray diffraction patterns (CuKα) of lithium nickelate A obtained in Example 1 according to the present invention and of nickel hydroxide which is a starting material for lithium nickelate A are shown in FIG. 2.

FIG. 2 shows x-ray diffraction patterns for nickel hydroxide as starting material, the active material A and the active material D according to the present invention, respectively. The diffraction patterns for A and D are as broad as the pattern for nickel hydroxide, so that it is apparent that the characteristic of the particles is kept during the oxidation. Comparing with A and D, yield of the active material (in this case, lithium nickelate) increases when a reaction temperature is higher. The result is considered to be due to difference of the reaction rate depending on temperature. These yields may be improved in a given condition.

Battery Evaluation Test

A battery was produced as follows. That is, lithium-containing nickel oxide (prepared by Examples 1 to 3 and prepared by a conventional method (which will be described later)) as an active material, 5% by weight of acetylene black as an electrically conducting additive and a mixed solution of 5% by weight of polyvinylidene difluoride and 3% by weight of n-methyl-2-pyrrolidol as a binder were mixed in a drying room to form paste. After the paste was applied onto an aluminum net of a collector, the paste was dried at 250° C. to thereby produce a positive plate having a size of 25 mm×25 mm.

A test battery was produced by using one sheet of the positive plate, two sheets of lithium metal plates each having the same size as the positive plate and serving as counter electrodes, and 300 ml of a (1:1 volume ratio) mixed solution of ethylene carbonate and diethylene carbonate containing 1 M lithium perchlorate as an electrolyte. A reference electrode of metal lithium was used for measurement of the potential of the positive electrode.

After charged up to 4.2 V in current density of 0.5 mA/cm$^2$ at 25° C., these batteries were discharged up to 2.5 V in the same current density.

The discharging characteristics of the positive electrodes (A, B and C) according to the present invention are shown in FIG. 1. Nickel oxyhydroxide and lithium carbonate were mixed, and the mixture was heated at 750° C. in an oxygen atmosphere to thereby obtain lithium nickelate as a conventional example. The discharging characteristic of a conventional positive electrode E produced by using the lithium nickelate in the same method as described above is also shown in FIG. 1 in which A uses the active material of Example 1, B uses the active material of Example 2, and C uses the active material of Example 3.

As seen from FIG. 1, the positive electrodes A, B and C using positive active materials according to the present invention exhibit monotonous discharging curves, so that the curves A, B and C indicate the fact that lithium ions are diffused smoothly. On the contrary, the voltage at the time of discharging in the conventional example E varies in two stages, so that the curve E indicates the fact that the diffusion of lithium ions with discharging is not made smoothly, that is, the curve E indicates the fact that the crystalline structure is changed.

Furthermore, it is apparent from a comparison of the discharging capacities that lithium nickelate according to the present invention is also exhibits excellent electrochemical characteristic because the discharging capacity of the active material according to the present invention is about 200 mAh/g whereas the discharging capacity of the active material according to the conventional method is about 160 mAh/g.

In the preparing method of the positive active material for lithium batteries according to the present invention, a compound represented by the chemical formula $H_xLi_yMO_2$ in a solution containing lithium ions is chemically oxidized, where $0 \leq x \leq 2$, $0 \leq y \leq 2$, $1 < (x+y) \leq 2$, and M is one or two kinds of transition metals selected from Co and Ni. Further, preferably, the compound is nickel hydroxide; the compound is nickel hydroxide containing nickel oxyhydroxide; the cobalt content of the compound is in a range of from 2 to 90 mol % {Co/(Ni+Co)}; the solution containing lithium ions has lithium hydroxide and water as constituent elements; and/or peroxodisulfate is used as an oxidizing agent in the oxidizing step.

What is claimed is:

1. A method of producing a positive active material for a lithium battery, consisting essentially of the step of:
   chemically oxidizing without a calcination step in a solution containing lithium ions a compound represented by the chemical formula $H_xLi_yMO_2$, where $0 \leq x \leq 2$, $0 \leq y \leq 2$, $1 < (x+y) \leq 2$ and M is a transition metal selected from the group consisting of Co, Ni, and mixtures thereof.

2. A method of producing a positive active material for a lithium battery according to claim 1, wherein said compound is nickel hydroxide.

3. A method of producing a positive active material for lithium batteries according to claim 1, wherein said compound is nickel hydroxide containing nickel oxyhydroxide.

4. A method for producing a positive active material for a lithium battery according to claim 1, wherein the cobalt content of said compound is in the range of 2 to 90 mol %, wherein the mol % is based on the amount of cobalt divided by the sum of the amount of nickel and the amount of cobalt.

5. A method for producing a positive active material for a lithium battery according to claim 4, wherein the cobalt content of said compound is in the range of 2 to 50 mol %, wherein the mol % is based on the amount of cobalt divided by the sum of the amount of nickel and the amount of cobalt.

6. A method of producing a positive active material for a lithium battery according to claim 5, wherein the cobalt content of said compound is in the range of 2 to 20 mol %, wherein the mol % is based on the amount of cobalt divided by the sum of the amount of nickel and the amount of cobalt.

7. A method of producing a positive active material for a lithium battery according to claim 1, wherein said solution containing lithium ions has lithium hydroxide and water as constituent elements.

8. A method of producing a positive active material for a lithium battery according to claim 1, wherein peroxodisulfate is used as an oxidizing agent in said oxidizing step.

9. A method of producing a positive active material for a lithium battery, consisting essentially of the steps of:
   preparing a compound represented by the chemical formula $H_xLi_yMO_2$, where $0 \leq x \leq 2$, $0 \leq y \leq 2$, $1 < (x+y) \leq 2$ and M is a transition metal selected from the group consisting of Co, Ni, and mixtures thereof; and
   chemically oxidizing said compound without a calcination step in a solution containing lithium ions at a temperature less than 100° C.

10. A method of producing a positive active material for a lithium battery according to claim 1, wherein sodium hypochlorite is used as an oxidizing agent in said oxidizing step.

* * * * *